US00H002196H

(19) United States
(12) Statutory Invention Registration
Tester

(10) Reg. No.: US H2196 H
(43) Published: Jul. 3, 2007

(54) METHOD FOR INTERCEPTING SPECIFIC SYSTEM CALLS IN A SPECIFIC APPLICATION FROM APPLICATIONS SPACE FOR SECURITY

(75) Inventor: Jonathan Tester, Encinitas, CA (US)

(73) Assignee: Symantec Corporation, Cupertino, CA (US)

(21) Appl. No.: 10/956,716

(22) Filed: Sep. 30, 2004

(51) Int. Cl.
*G06F 12/14* (2006.01)

(52) U.S. Cl. ..... 726/22; 726/23; 726/24

(58) Field of Classification Search ..... 726/22, 726/23, 24; 713/164, 165
See application file for complete search history.

(56) References Cited

U.S. PATENT DOCUMENTS

2006/0143707 A1 * 6/2006 Song et al. ..... 726/22

* cited by examiner

*Primary Examiner*—Dan Pihulic
(74) *Attorney, Agent, or Firm*—Gunnison, McKay & Hodgson, L.L.P.; Lisa A. Norris

(57) ABSTRACT

One or more specified system calls of a running process are trapped in kernel space from user space. While the process is stopped, information associated with the process is read and a security analysis is performed on the information to determine whether malicious code activity is detected, such as a buffer overflow. If malicious code activity is detected, protective action is taken, such as killing the specified system call. Otherwise, if malicious code activity is not detected, the specified system call is restarted.

15 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR INTERCEPTING SPECIFIC SYSTEM CALLS IN A SPECIFIC APPLICATION FROM APPLICATIONS SPACE FOR SECURITY

BACKGROUND OF THE INVENTION

1. Field of the Invention

The present invention relates to the protection of computer systems. More particularly, the present invention relates to a method for intercepting calls in a running process from user space to allow security analysis to be performed.

2. Description of Related Art

Most operating systems currently provide debugging support, such as through special debugging APIs (Application Program Interfaces). Typically, a debugging API allows a software developer to halt the execution of a running program from user space and to examine the state of the process, such as the variables and the stack, in order to identify and correct programming errors in the program code.

SUMMARY OF THE INVENTION

In accordance with one embodiment of the invention, a method includes establishing a break upon entry into one or more specified system calls of a process running in user space, wherein the break stops the one or more specified system calls in kernel space prior to execution. Upon the break, information associated with the process is dynamically read, and a security analysis is performed on the information to determine whether malicious code activity is detected.

If malicious code activity is detected, protective action is taken, such as killing the specified system call. Otherwise, if malicious code activity is not detected, the specified system call is restarted. Embodiments in accordance with the present invention can be used to protect privileged processes from malicious code attacks, such as buffer overflow attacks or return to LIBC attacks.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Embodiments in accordance with the present invention utilize application debugging features of an operating system to trap a specified system call(s) in the kernel space from user space and to perform a security analysis on information associated with a parent process of the specified system call(s) for the presence of malicious code activity. In particular, the present invention utilizes the application debugging feature provided by many operating systems that allows the applications debugger to break on, also termed herein trap, a system call from user space.

For purposes of description, the present invention is described with reference to a Solaris operating system and the /proc file system. However, the present invention is not limited to the present example, and can be used on other operating systems on which an applications debugger can be run. For example, gdb on Unix, Linux and Windows operating systems traps system calls in the kernel space. The /proc file system is similar on Solaris and AIX operating systems, but other operating system platforms may require a port.

With reference to Solaris, generally, the /proc file system is a file system that provides access to the state of each process running on the Solaris operating system and serves as a debugging API from user space. Herein the term user space refers to application space that is external to the kernel space. In the /proc file system, each running process is identified using a PID (process identifier). Debuggers, the /proc file system, user space, and kernel space are all terms well-known to those of skill in the art and so are only briefly discussed to avoid detracting from the principles of the invention.

Figure 2:
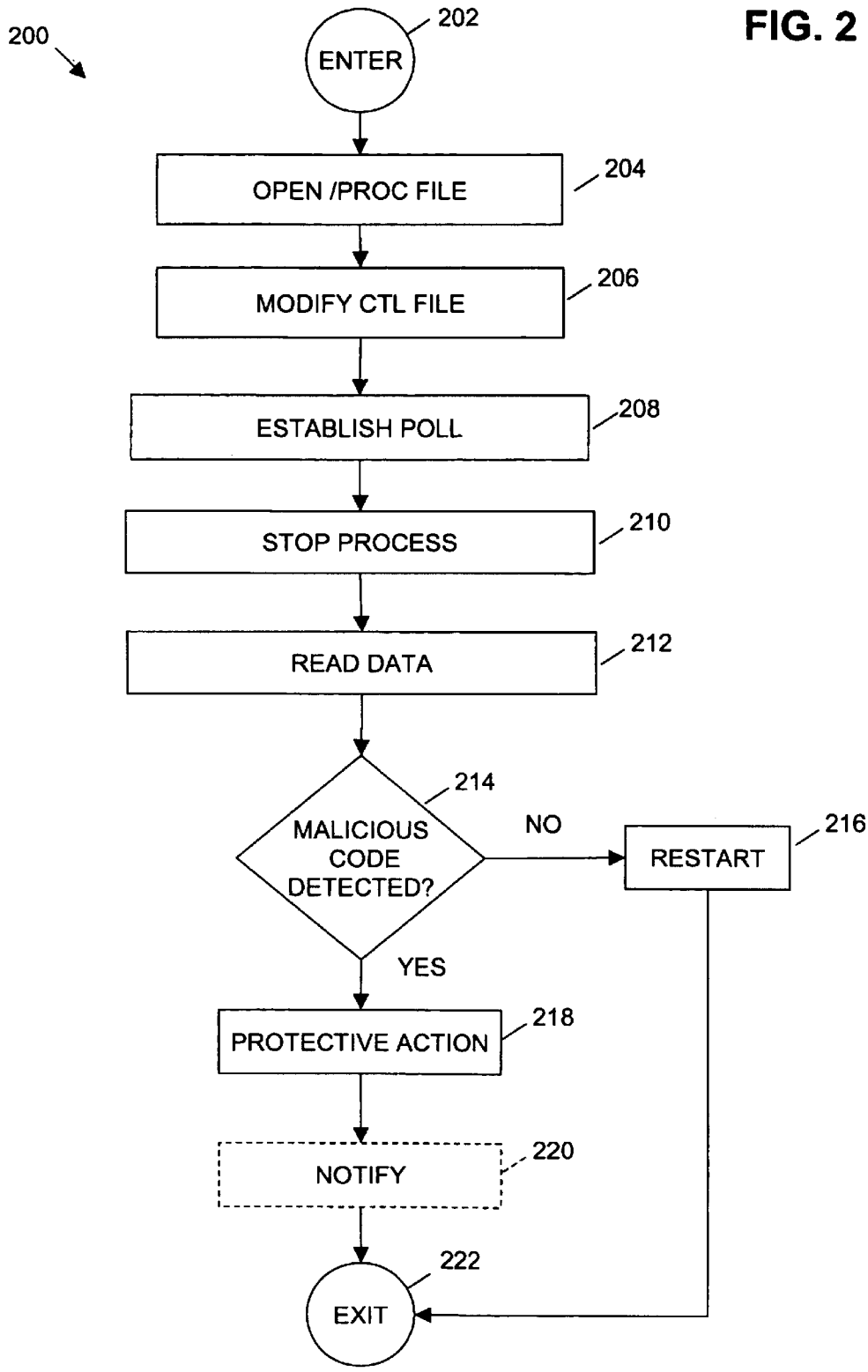
FIG. 2 illustrates a flow diagram of a process implemented by the security application of FIG. 1 in accordance with one embodiment of the invention.

Referring generally, to FIG. 2, in one embodiment, a method includes opening a /proc file for a specified process that is running in user space (operation 204) and modifying the /proc file for the specified process to break, i.e., stop execution, on entry to a specified system call(s) (operation 206). A poll is established on the /proc file for the specified (operation 208) to alert when the polls are set so that information associated with the specified process can be read once the specified process is stopped. When the specified process is stopped on entry to the specified system call(s) (operation 210), the information associated with the specified process is read (operation 212) and analyzed to determine whether malicious code is detected in the process (operation 214). Upon a determination that malicious code activity is detected, protective action is taken (operation 218), such as killing or aborting the trapped system call. Optionally, a notification of the protective action taken is provided (operation 220). Otherwise, if a determination is made that malicious code activity is not detected, the trapped system call is restarted (operation 216).

Figure 1:
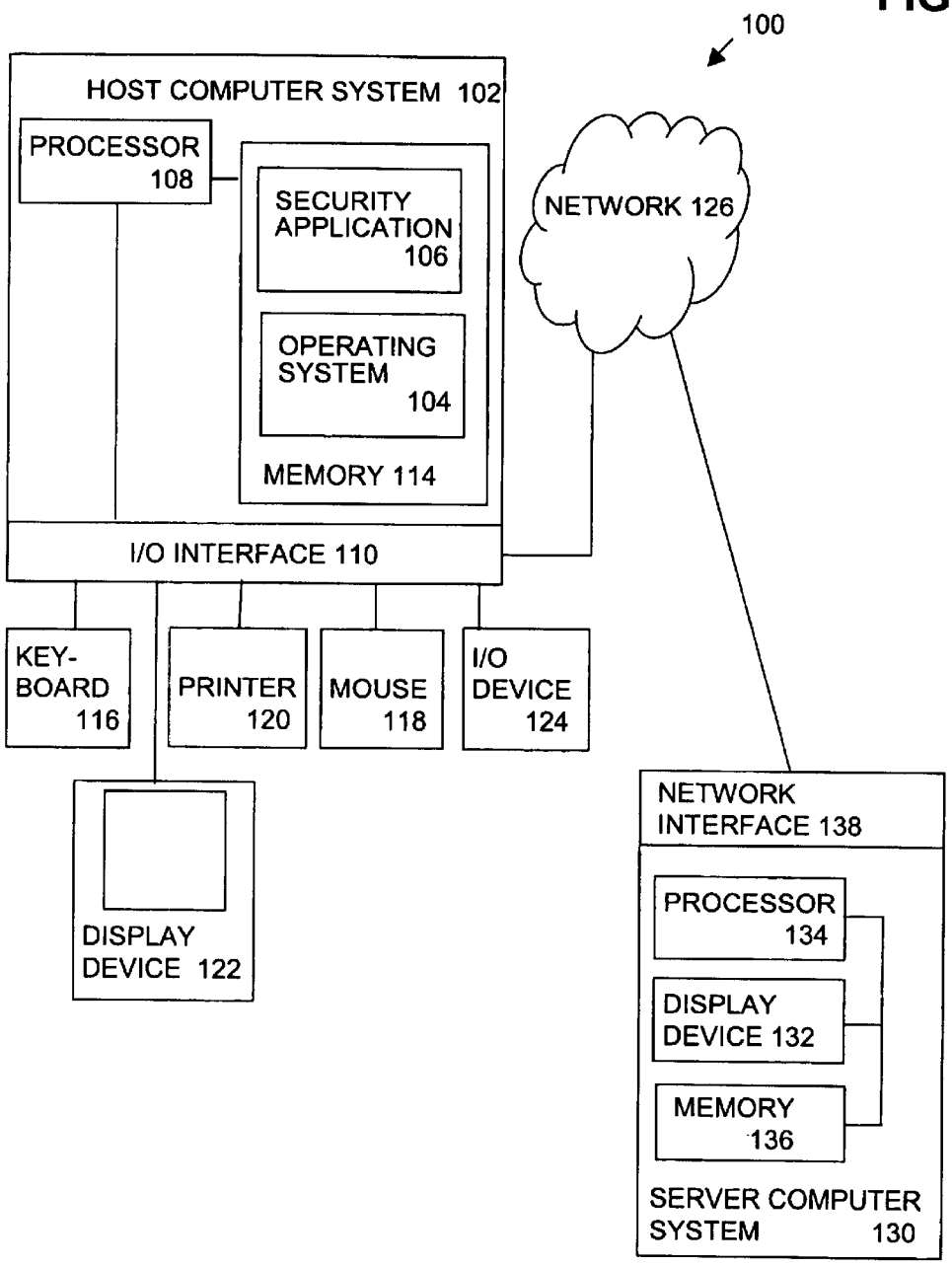
FIG. 1 is a diagram of a client-server system that includes a security application executing on a host computer system in accordance with one embodiment of the present invention.

In particular, FIG. 1 is a diagram of a client-server system 100 that includes a security application 106 executing on a host computer system 102 in accordance with one embodiment of the present invention. Host computer system 102, sometimes called a client or user device, typically includes a central processing unit (CPU) 108, hereinafter processor 108, an operating system 104, such as Solaris, an input/output (I/O) interface 110, and a memory 114. In the present embodiment, operating system 104 includes a debugging interface which can break on a system call of a running process from user space, for example, a /proc file system debugging API.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, security application 106 is loaded into host computer system 102 via I/O device 124, such as from a CD, DVD or floppy disk containing security application 106. In one embodiment, security application 106 is run as a daemon application.

In the present illustration, host computer system 102 is coupled to a server computer system 130 by a network 126. Server computer system 130 typically includes a display device 132, a processor 134, a memory 136, and a network interface 138. Network 126 can be any network or network system that is of interest to a user. In various embodiments, network interfaces 138 and I/O interface 110 include analog modems, digital modems, or a network interface card.

In the present embodiment, security application 106 is stored in memory 114 of host computer system 102 and executed on host computer system 102. The particular type and configuration of host computer system 102 and server computer system 130 are not essential to this embodiment of the present invention.

More particularly, FIG. 2 illustrates a flow diagram of a process 200 implemented by security application 106 in accordance with one embodiment of the invention. Referring now to FIGS. 1 and 2 together, execution of security application 106 by processor 108 results in the operations of process 200, in which, in one embodiment, a specified process that is running on host computer system 102 is located by security application 106 from user space, and process 200 is entered at ENTER operation 202.

In one embodiment, the specified process is a privileged process, such as telnetd, however, other processes which are desirable to protect from malicious code activity can also be specified. For purposes of description it is assumed that the PID assigned this specified process is 250. From ENTER operation 202, processing transitions to an OPEN /PROC FILE operation 204.

In OPEN /PROC FILE operation 204, the /proc file for the specified running process, e.g., /proc/250, is opened and processing transitions from OPEN /PROC FILE operation 204 to a MODIFY CTL FILE operation 206.

In MODIFY CTL FILE operation 206, the ctl file of the /proc file for the specified process, e.g., /proc/250/ctl, is modified to break on a specified system call(s). The ctl file is a write-only file to which control messages can be written to direct the operating system to change some aspect of the process' state or control its behavior.

To break on a system call during a running process, typically root permission is required. In one embodiment, a PCSENTRY structure is written to the /proc/<pid>/ctl file of the specified process. The PCSENTRY command message instructs a process to stop on entry to, i.e., break on, a specified system call(s). This command message changes the /proc ctl file and modifies the system calls for that process.

For example, in one embodiment, the /proc/250/ctl file is modified by writing /proc/250/ctl FORK and ENTRY for exec such that process 250 will stop on entry to the system call to exec, and the system call will be trapped in the kernel space prior to execution. In some embodiments, a PCSET with PR_FORK can be written to the /proc/<pid>/ctl so that all the children inherit the same debug flags and trap on the same system calls. From MODIFY CTL FILE operation 206, processing transitions to an ESTABLISH POLL operation 208.

In ESTABLISH POLL operation 208, in one embodiment, a poll is established on the /proc file of the specified system call. In one embodiment, the poll is set to alert security application 106 when the file descriptors POLLWRNORM and POLLPRI are set for the /proc/<pid>ctl file. Processing waits, e.g., sleeps, until the specified system call is initiated, and from ESTABLISH POLL operation 208, processing transitions to a STOP PROCESS operation 210.

In STOP PROCESS operation 210, when a break on the specified process is made on entry to the specified system call, e.g., exec, the specified process is stopped. From STOP PROCESS operation 210, processing transitions to a READ DATA operation 212.

In READ DATA operation 212, once the process is stopped and the poll conditions set, e.g., POLLWRNORM and POLLPRI are set and security application 106 is alerted, data is read from selected /proc files of the specified process, such as the /proc/<pid>/status and /proc/<pid>/info files, e.g., /proc/250/status and /proc/250/info files. The following is an example of information available from the status file about a specified process:

```
typedef struct pstatus {
    int          pr_flags;     /* flags (see below) */
    int          pr_nwlp;      /* number of lwps in the process */
    pid_t        pr_pid;       /* process id */
    pid_t        pr_ppid;      /* parent process id */
    pid_t        pr_pgid;      /* process group id */
    pid_t        pr_sid;       /* session id */
    id_t         pr_aslwpid;   /* lwp-id of the aslwp, if any */
    id_t         pr_agentid;   /* lwp-id of the agent lwp, if any */
    sigset_t     pr_sigpend;   /* set of process pending signals */
    uintptr_t    pr_brkbase;   /* virtual address of the process heap*/
    size_t       pr_brksize;   /* size of the process heap, in bytes */
    uintptr_t    pr_stkbase;   /* virtual address of the process stack */
    size_t       pr_stksize;   /* size of the process stack, in bytes */
    timestruc_t  pr_utime;     /* process user cpu time */
    timestruc_t  pr_stime;     /* process system cpu time */
    timestruc_t  pr_cutime;    /* sum of children's user times */
    timestruc_t  pr_cstime;    /* sum of children's system times */
    sigset_t     pr_sigtrace;  /* set of traced signals */
    fltset_t     pr_flttrace;  /* set of traced faults */
    sysset_t     pr_sysentry;  /* set of system calls traced on entry */
    sysset_t     pr_sysexit;   /* set of system calls traced on exit */
    lwpstatus_t  pr_lwp;       /* status of the representative lwp */
} pstatus_t;
```

Additionally, the folllowing is an example of information available for each thread of a specified process:

```
typedef struct lwpstatus {
    int          pr_flags;     /* flags (see below) */
    id_t         pr_lwpid;     /* specific lwp identifier */
    short        pr_why;       /* reason for lwp stop, if stopped */
    short        pr_what;      /* more detailed reason */
    short        pr_cursig;    /* current signal, if any */
    siginfo_t    pr_info;      /* info associated with signal or fault */
    sigset_t     pr_lwppend;   /* set of signals pending to the lwp */
    sigset_t     pr_lwphold;   /* set of signals blocked by the lwp */
    struct       pr_action;    /* signal action for current signal */
    sigaction
    stack_t      pr_altstack;  /* alternate signal stack info */
    uintptr_t    pr_           /* address of previous ucontext */
                 oldcontext;
    short        pr_syscall;   /* system call number (if in syscall) */
    short        pr_nsysarg;   /* number of arguments to this syscall
                               */
    int          pr_errno;     /* errno for failed syscall */
    long         pr_sysarg     /* arguments to this syscall */
                 [PRSYSARGS];
    long         pr_rval1;     /* primary syscall return value */
    long         pr_rval2;     /* second syscall return value, if any */
    char         pr_clname     /* scheduling class name */
                 [PRCLSZ];
```

-continued

```
    timestruc_t   pr_tstamp;   /* real-time time stamp of stop */
    u_long        pr_instr;    /* current instruction */
    prgregset_t   pr_reg;      /* general registers */
    prfpregset_t  pr_fpreg;    /* floating-point registers */
} lwpstatus_t;
```

Further, the following is an example of information available from the info file about a specified process:

```
typedef struct psinfo {
    int           pr_flag;     /* process flags */
    int           pr_nlwp;     /* number of lwps in the process */
    pid_t         pr_pid;      /* process id */
    pid_t         pr_ppid;     /* process id of parent */
    pid_t         pr_pgid;     /* process id of process group leader */
    pid_t         pr_sid;      /* session id */
    uid_t         pr_uid;      /* real user id */
    uid_t         pr_euid;     /* effective user id */
    gid_t         pr_gid;      /* real group id */
    gid_t         pr_egid;     /* effective group id */
    uintptr_t     pr_addr;     /* address of process */
    size_t        pr_size;     /* size of process image in Kbytes */
    size_t        pr_rssize;   /* resident set size in Kbytes */
    dev_t         pr_ttydev;   /* controlling tty device (or
                                  PRNODEV) */
    u_short       pr_pctcpu;   /* % of recent cpu time used by all
                                  lwps */
    u_short       pr_pctmem;   /* % of system memory used by process
                                  */
    timestruc_t   pr_start;    /* process start time, from the epoch
                                  */
    timestruc_t   pr_time;     /* cpu time for this process */
    timestruc_t   pr_ctime;    /* cpu time for reaped children */
    char          pr_fname     /* name of exec'ed file */
                  [PRFNSZ];
    char          pr_psargs    /* initial characters of arg list */
                  [PRARGSZ];
    int           pr_wstat;    /* if zombie, the wait ( ) status */
    int           pr_argc;     /* initial argument count */
    uintptr_t     pr_argv;     /* address of initial argument vector */
    uintptr_t     pr_envp;     /* address of initial environment vector
                                  */
    lwpsinfo_t    pr_lwp;      /* information for representative lwp */
} psinfo_t;
typedef struct lwpsinfo {
    int           pr_flag;     /* lwp flags */
    id_t          pr_lwpid;    /* lwp id */
    uintptr_t     pr_addr;     /* internal address of lwp */
    uintptr_t     pr_wchan;    /* wait addr for sleeping lwp */
    char          pr_stype;    /* synchronization event type */
    char          pr_state;    /* numeric lwp state */
    char          pr_sname;    /* printable character for pr_state */
    char          pr_nice;     /* nice for cpu usage */
    short         pr_syscall;  /* system call number (if in syscall) */
    char          pr_oldpri;   /* pre-SVR4, low value is high priority
                                  */
    char          pr_cpu;      /* pre-SVR4, cpu usage for scheduling
                                  */
    int           pr_pri;      /* priority, high value = high priority */
    u_short       pr_pctcpu;   /* % of recent cpu time used by this
                                  lwp */
    timestruc_t   pr_start;    /* lwp start time, from the epoch */
    timestruc_t   pr_time;     /* cpu time for this lwp */
    char          pr_clname    /* scheduling class name */
                  [PRCLSZ];
    char          pr_name      /* name of system lwp */
                  [PRFNSZ];
    processorid_  pr_onpro;    /* processor which last ran this lwp */
    t
    processorid_  pr_bindpro;  /* processor to which lwp is bound */
    t
    psetid_t      pr_bindpset; /* processor set to which lwp is bound
                                  */
} lwpsinfo_t;
```

Once the data is read, from READ DATA operation 212, processing transitions to a MALICIOUS CODE DETECTED check operation 214.

In MALICIOUS CODE DETECTED check operation 214, a security analysis is performed utilizing information read from the /proc file system in operation 210, such as the /proc files status and info, as well as other /proc files. In one embodiment, a security analysis is performed on the information read during operation 210 to determine whether malicious code activity is detected. For example, in one embodiment, stack information is analyzed for buffer overflow as the stack should not have changed during a system call. Additionally, in one embodiment, return from LIBC attacks can be detected by opening the /proc/<pid>/object files and the preceding command from the return can be checked to determine if it is a call. Further, the return address can also be mapped to ensure it is associated with a mapped page.

Upon a determination that malicious code activity is detected ("YES"), processing transitions from MALICIOUS CODE DETECTED check operation 214 to a PROTECTIVE ACTION operation 218.

In PROTECTIVE ACTION operation 218, protective action is taken, such as blocking completion of the trapped system call. For example, in some embodiments, PCKILL or PCSABORT (abort system call) are written to the /proc ctl file or the process can be left in a STOP state for further analysis. From PROTECTIVE ACTION operation 218, processing optionally transitions to a NOTIFY operation 220, or directly to an EXIT operation 222 if optional NOTIFY operation 220 is not performed.

In optional NOTIFY operation 220, a notification of the protective action taken is provided to a user or other recipient, such as a system administrator. From optional NOTIFY operation 220, processing transitions to EXIT operation 222, with processing exiting method 200.

Referring again to MALICIOUS CODE DETECTED check operation 214, upon a determination that malicious code is not detected ("NO"), processing transitions from MALICIOUS CODE DETECTED check operation 214 to a RESTART operation 216.

In RESTART operation 216, the trapped system call, e.g., exec, is restarted, and the system call is allowed to complete. For example, the process can be restarted by writing a PCRUN to the /proc/<pid>/ctl file. From RESTART operation 216, processing transitions to EXIT operation 222, with processing exiting method 200.

In an alternative embodiment, a notification can also be received before the system call exits, by writing PCSEXIT to the /proc ctl file.

Figure 3:
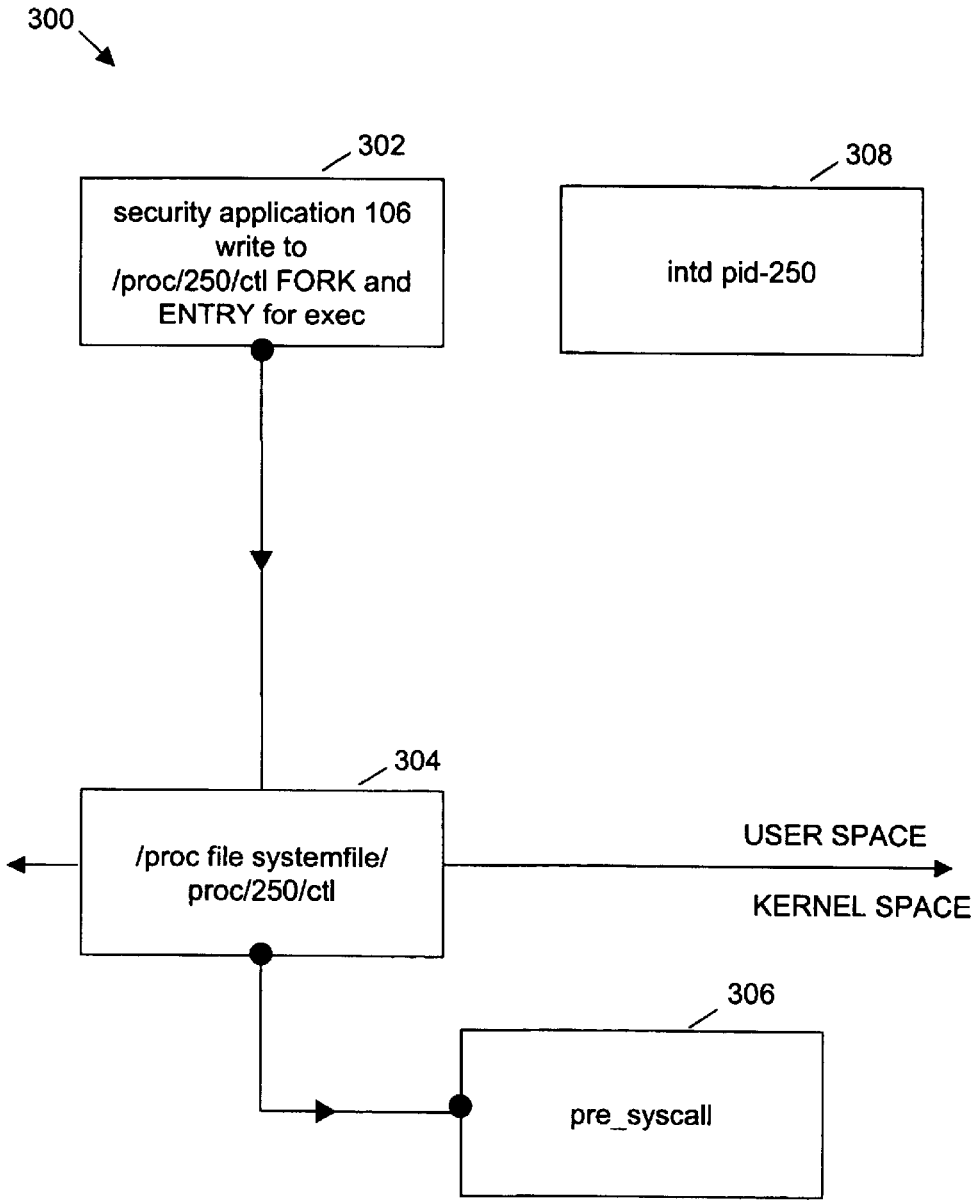
FIG. 3 illustrates a block diagram of a /proc file being modified to break for a system call in accordance with one embodiment of the invention.

FIG. 3 illustrates a block diagram of a /proc ctl file being modified to break for a system call of process 250 in accordance with one embodiment of the invention. In FIG. 3, at block 302 security application 106, from user space, writes a modification to the /proc ctl file of running process PID 250 (identified at block 308) to break at a system call to exec. At block 304, the /proc ctl file is modified to break at the specified system call, e.g., exec, represented by block 306 as an uncompleted system call, pre_syscall.

Figure 4:
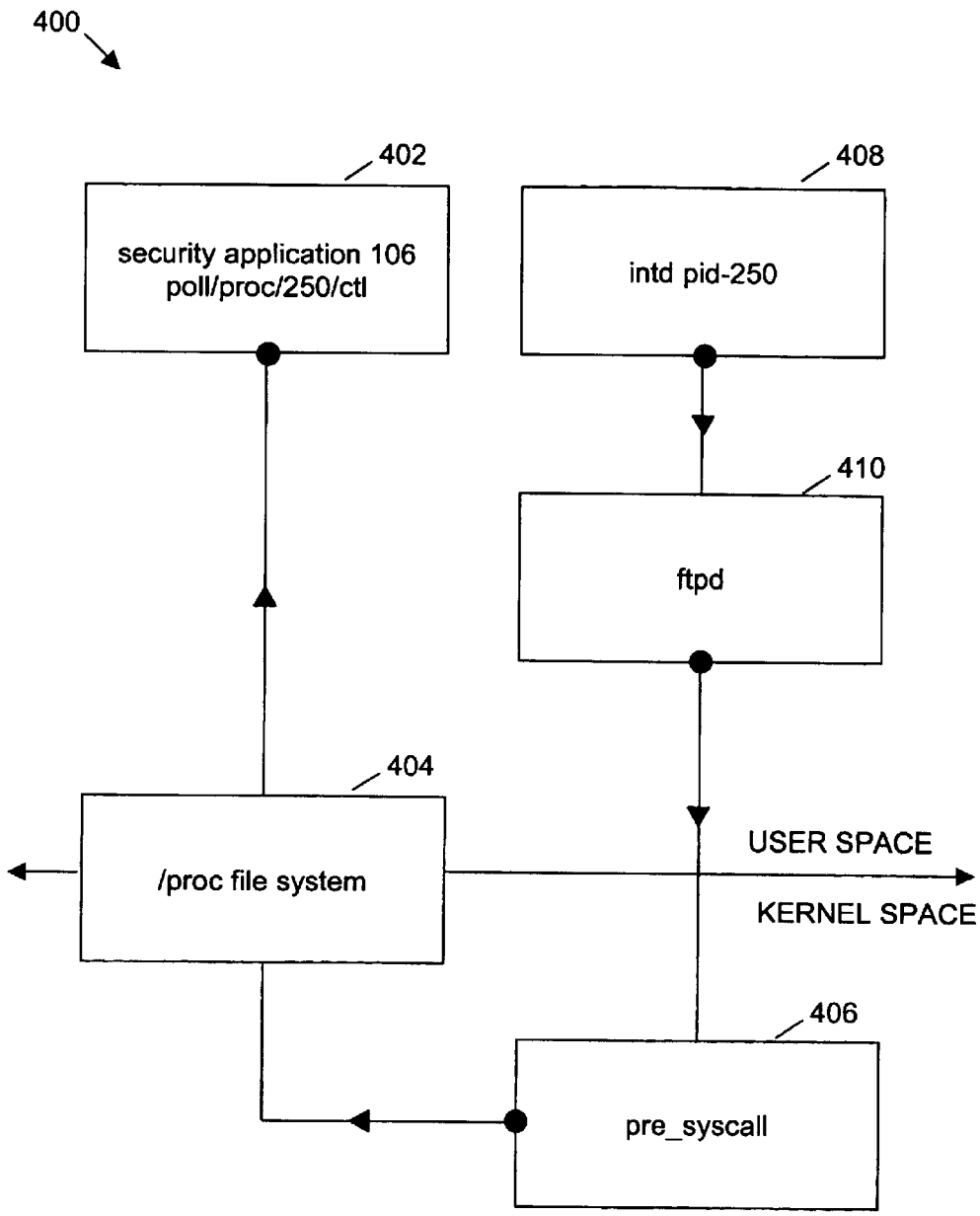
FIG. 4 illustrates a block diagram of a poll being set in accordance with one embodiment of the invention.

FIG. 4 illustrates a block diagram of a poll being met for the /proc file of process 250 in accordance with one embodiment of the invention. In FIG. 4, at block 408 the running process PID 250 initiates an ftpd at block 410 in user land that enters a system call for exec in the kernel space, e.g., presyscall, at block 406. As the /proc ctl file was earlier modified to break at the entry to the system call and a poll placed on the /proc file, at block 404, when the poll conditions are set, e.g., POLLWRNORM and POLLPRI are set, security application 106 is alerted and information associated with the process 250 is read by security application 106 and used for determining whether malicious code activity is detected.

Method 200 provides one embodiment of the present invention where specified system calls in a running process are controlled from user space. In particular, specified processes are stopped from running when trapped on the execute system call.

Other desired security features can also be included in accordance with the present invention. For example, a process can be stopped from removing a file, and one particular process can be stopped from making one particular system call having specified parameters. Additionally, all children of a process can be set to be monitored. If inetd is monitored, control can be gained over all the network system calls on a computer system, providing a simple NIDS (Network Intrusion Detection System) solution.

Further, using nice, a process can be throttled dynamically by raising and lowering its priority. Using syscall., the system call number just stopped on can be read. Using argc, the number of arguments to the system call can be read. Using argv, the value of arguments to the system call can be read. Using envp, the environment vector can be read. Using stkbase and stksize, the status of the stack before and after a particular system call can be read (return from LIBC). Using brkbase and brksize, the status of the heap can be read. Using pr_reg[R_PC], the return address can be checked to check for a buffer or heap overflow. Using pr_reg[R_SP], the current stack pointer can be checked (return libc).

Thus, as described herein, in accordance with the invention, specified system calls of specified processes are trapped in the kernel space from user space. Information associated with the process is read and a security analysis is performed on the information to determine whether malicious code activity is detected, such as a buffer overflow. If malicious code activity is detected, protective action is taken, such as killing the specified system call. Otherwise, if malicious code activity is not detected, the specified system call is restarted.

Embodiments in accordance with the invention permit other user space system call interception to be by-passed. Further, embodiments in accordance with the invention work independent of kernel space patch levels and are portable to other operating systems. The binary of the process does need to be modified, and the target processor does not need to be recompiled.

Referring again to FIG. 1, security application 106 is in computer memory 114. As used herein, a computer memory refers to a volatile memory, a non-volatile memory, or a combination of the two.

Although security application 106 is referred to as an application, this is illustrative only. Security application 106 should be capable of being called from an application or the operating system.

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, security application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the worm blocking functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the security functionality in accordance with one embodiment of present invention can be implemented in a wide variety of computer system configurations. In addition, the security functionality could be stored as different modules in memories of different devices.

For example, security application 106 could initially be stored in server computer system 130, and then as necessary, a portion of security application 106 could be transferred to host computer system 102 and executed on host computer system 102. Consequently, part of the security functionality would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, security application 106 is stored in memory 136 of server computer system 130. Security application 106 is transferred over network 126 to memory 114 in host computer system 102. In this embodiment, network interface 138 and I/O interface 110 would include analog modems, digital modems, or a network interface card. If modems are used, network 126 includes a communications network, and security application 106 is downloaded via the communications network.

This disclosure provides exemplary embodiments of the present invention. The scope of the present invention is not limited by these exemplary embodiments. Numerous variations, whether explicitly provided by the specification or implied by the specification or not, may be implemented by one of skill in the art in view of this disclosure.

What is claimed is:

1. A method comprising:

establishing a break upon entry into one or more specified system calls of a process running in user space, wherein said break traps said one or more specified system calls in kernel space prior to execution;

upon said break, dynamically reading information associated with said process; and performing a security analysis on said information to determine whether malicious code activity is detected.

2. The method of claim 1, further comprising:

wherein upon a determination that said malicious code activity is detected, taking protective action.

3. The method of claim 1, further comprising:

wherein upon a determination that said malicious code activity is not detected, restarting said system call.

4. The method of claim 1, further comprising:

establishing a poll on said process.

5. A method comprising:

opening a /proc file for a specified process that is running on a computer system in user space;

modifying a ctl file of said /proc file to break on one or more specified system calls of said specified process;

establishing a poll on said /proc file, said poll alerting when one or more poll conditions are set;

upon said break when said poll conditions are set, dynamically reading information associated with said specified process; and determining whether malicious code activity is detected based upon a security analysis of said information.

6. The method of claim 5, further comprising:

wherein upon a determination that said malicious code activity is detected, taking protective action.

7. The method of claim 6, further comprising:

providing a notification of said protective action.

8. The method of claim 5, further comprising:

wherein upon a determination that said malicious code activity is not detected, restarting said specified system call.

9. The method of claim 5, wherein said information is read from a /proc status file.

10. The method of claim 5, wherein said information is read from a /proc info file.

11. A system comprising:

means for opening a /proc file for a specified process that is running on a computer system in user space;

means for modifying a ctl file of said /proc file to break on one or more specified system calls of said specified process;

means for dynamically reading information associated with said specified process; and means for determining whether malicious code activity is detected based upon a security analysis of said information.

12. The system of claim 11, further comprising:

means for establishing a poll on said /proc file.

13. The system of claim 11, further comprising:

means for taking protective action.

14. The system of claim 13, further comprising:

means for providing a notification of said protective action.

15. The system of claim 11, further comprising:

means for restarting said specified system call.

* * * * *